(12) United States Patent
Barber et al.

(10) Patent No.: US 10,486,151 B2
(45) Date of Patent: Nov. 26, 2019

(54) ION-EXCHANGE MEMBRANE WITH MULTI-LAYERED SUPPORT SUBSTRATE

(71) Applicant: BL TECHNOLOGIES, INC., Minnetonka, MN (US)

(72) Inventors: John H. Barber, Guelph (CA); Russell James MacDonald, Burlington, MA (US); Yongchang Zheng, Westborough, MA (US); Kai Zhang, Singapore (SG); Yonghong Zhao, Singapore (SG)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 15/556,735

(22) PCT Filed: Mar. 10, 2015

(86) PCT No.: PCT/CN2015/073947
§ 371 (c)(1),
(2) Date: Sep. 8, 2017

(87) PCT Pub. No.: WO2016/141550
PCT Pub. Date: Sep. 15, 2016

(65) Prior Publication Data
US 2018/0043345 A1    Feb. 15, 2018

(51) Int. Cl.
| | | |
|---|---|---|
| *B01J 47/12* | (2017.01) | |
| *B01D 69/10* | (2006.01) | |
| *B01D 71/82* | (2006.01) | |
| *C25B 13/08* | (2006.01) | |
| *B01D 61/42* | (2006.01) | |
| *B01D 69/02* | (2006.01) | |
| *B01D 69/12* | (2006.01) | |
| *B01D 69/14* | (2006.01) | |
| *B01D 71/28* | (2006.01) | |
| *B01D 71/30* | (2006.01) | |
| *B01D 71/76* | (2006.01) | |
| *B01J 39/20* | (2006.01) | |
| *B01J 41/14* | (2006.01) | |
| *C08J 5/22* | (2006.01) | |
| *B32B 5/26* | (2006.01) | |
| *B32B 5/28* | (2006.01) | |
| *B32B 5/02* | (2006.01) | |
| *B32B 7/02* | (2019.01) | |

(52) U.S. Cl.
CPC ............ *B01J 47/12* (2013.01); *B01D 61/422* (2013.01); *B01D 69/02* (2013.01); *B01D 69/10* (2013.01); *B01D 69/125* (2013.01); *B01D 69/141* (2013.01); *B01D 71/28* (2013.01); *B01D 71/30* (2013.01); *B01D 71/76* (2013.01); *B01D 71/82* (2013.01); *B01J 39/20* (2013.01); *B01J 41/14* (2013.01); *B32B 5/022* (2013.01); *B32B 5/026* (2013.01); *B32B 5/26* (2013.01); *B32B 5/28* (2013.01); *B32B 7/02* (2013.01); *C08J 5/2231* (2013.01); *C25B 13/08* (2013.01); *B01D 2321/28* (2013.01); *B01D 2325/42* (2013.01); *B32B 2260/023* (2013.01); *B32B 2260/046* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2307/20* (2013.01); *B32B 2307/50* (2013.01); *B32B 2307/54* (2013.01); *B32B 2307/724* (2013.01); *B32B 2307/732* (2013.01); *B32B 2535/00* (2013.01); *C08J 2325/18* (2013.01); *C08J 2333/14* (2013.01)

(58) Field of Classification Search
CPC ........ B01J 47/12; B01J 39/20; B01D 2325/42
See application file for complete search history.

(56) References Cited

U.S. PATENT DOCUMENTS

| | | | |
|---|---|---|---|
| 3,356,607 A | 12/1967 | Eisenmann et al. | |
| 4,505,797 A | 3/1985 | Hodgdon et al. | |
| 2013/0052563 A1* | 2/2013 | Sharman | C25B 13/00 429/492 |
| 2013/0146450 A1 | 6/2013 | Kishino et al. | |
| 2015/0291452 A1 | 10/2015 | Jikihara et al. | |

FOREIGN PATENT DOCUMENTS

| | | |
|---|---|---|
| JP | S59102404 A | 6/1984 |
| JP | S59179625 A | 10/1984 |
| JP | S62253632 A | 11/1987 |
| JP | 2005520002 A | 7/2005 |
| WO | 03022912 A3 | 9/2004 |
| WO | 2012023451 A1 | 2/2012 |
| WO | 2013129399 A1 | 9/2013 |

(Continued)

OTHER PUBLICATIONS

European Patent Application No. 15884233.6, Partial Supplementary European Search Report dated Oct. 19, 2018.
International Patent Application No. PCT/CN2015/073947, International Preliminary Report on Patentability dated Sep. 21, 2017.
International Patent Application No. PCT/CN2015/073947, International Search Report and Written Opinion dated Dec. 10, 2015.

(Continued)

*Primary Examiner* — Arun S Phasge

(57) ABSTRACT

An ion-exchange membrane is disclosed here including ion-permeable layers impregnated with an ion-exchange material and arranged in an order from one face of the membrane to the opposite face of the membrane such that opposing layers in the supporting membrane substrate provide sufficiently identical physical properties to substantially avoid irregular expansion when in a salt solution. The ion-permeable layers including at least one non-woven layer and at least one reinforcing layer.

24 Claims, 4 Drawing Sheets

(56) References Cited

FOREIGN PATENT DOCUMENTS

WO    2014039171 A2    3/2014
WO    2014103819 A1    7/2014

OTHER PUBLICATIONS

Japanese Patent Application No. 2017-545943, Office Action dated Nov. 27, 2018—English Translation Available.
Chinese Patent Application No. 201580077613.8, Office Action dated Oct. 9, 2018.
Chinese Patent Application No. 201580077613.8, Office Action dated Jul. 2, 2019.
Taiwan Patent Application No. 105105492, Office Action and Search Report dated Sep. 6, 2019.

* cited by examiner

ION-EXCHANGE MEMBRANE WITH MULTI-LAYERED SUPPORT SUBSTRATE

FIELD OF INVENTION

The present disclosure relates generally to ion-exchange membranes having multi-layered support substrates.

BACKGROUND OF THE INVENTION

The following paragraphs are not an admission that anything discussed in them is prior art or part of the knowledge of persons skilled in the art.

Ion-exchange membranes are used as electrolytic membranes for electrodialysis (ED), bipolar ED, reversed electrodialysis (RED), electrodeionization (EDI), and electrodialysis reversal (EDR). These purification processes transport ions from one solution to another solution through the ion-exchange membrane under the influence of an applied electric potential difference.

Ion-exchange membranes useful for electrodialysis include an ion-exchange material and a supporting substrate for the ion-exchange material. In ion-exchange membranes produced using a woven or non-woven fabric sheet as the supporting substrate, voids in the woven or non-woven fabric sheet are filled with the ion-exchange material.

SUMMARY OF INVENTION

One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

Using non-woven fabric in ion-exchange membranes is desirable as the highly interlaced structure of fibers in non-woven fabric may reduce leaking, electrical resistance, thickness, or any combination thereof, in comparison to membranes formed using woven fabrics. However, a membrane formed only using non-woven fabric often has an undesirable physical property when compared to membranes formed using woven fabrics. The undesirable physical property may be reduced strength, reduced dimensional stability, or reduced shape stability. Additionally, the membrane may have non-uniform distribution of ion-exchange material if there are irregularities in the non-woven fabric. Such non-uniform distribution of ion-exchange material could result in ion-exchange membrane with inconsistent physical properties.

In order to improve at least one of the undesirable physical properties, ion-exchange membranes made with non-woven fabrics may also include a reinforcing layer. However, addition of a reinforcing layer increases the thickness of the membrane and, as a result, the resistance of the membrane also increases. Ion-exchange membranes having a single reinforcing layer attached to a single non-woven fabric layer may also expand irregularly when in salt solutions, which results in undulation of the membranes. This irregular expansion is due to the differences in expansion, or contraction, of the two layers when in the salt solution.

Therefore, there remains a need for an ion-exchange membrane having a support substrate, where the support substrate includes (a) a non-woven fabric layer as a support material for the ion-exchange material, and (b) a reinforcing layer, where the ion-exchange membrane exhibits reduced irregular expansion when placed in a salt solution. It is especially desirable if the ion-exchange membrane is at least as thin as known ion-exchange membranes that have a non-woven fabric layer and a reinforcing layer.

Reducing the thickness of the ion-exchange membrane is desirable as such reduction may result in higher throughput from an electrolytic cell stack, all other conditions being equal, since more membranes may be loaded into the same device. Reducing the thickness of the ion-exchange membranes may result in a reduction of chemicals consumed for a given area of membrane since thinner membranes have less ion-exchange material per surface area of membrane. Reducing the thickness of the ion-exchange membranes may result in a reduction of energy consumption in an electrolytic purification process if it corresponds with a reduction in resistance of the thinner membranes.

One or more described embodiments attempt to address or ameliorate one or more shortcomings involved with ion-exchange membranes formed from non-woven fabric and a reinforcing layer.

Generally, the present disclosure provides an ion-exchange membrane that includes an ion-exchange material and a supporting membrane substrate impregnated with the ion-exchange material. The supporting membrane substrate, also referred to herein as "supporting substrate", includes ion-permeable layers in an order such that opposing layers in the supporting substrate provide sufficiently identical physical properties to substantially avoid irregular expansion when in a salt solution.

In the context of the present disclosure, opposing layers in a membrane would be understood to refer to layers at opposites points in the cross-section of the supporting substrate. For example, in a supporting substrate that is 0.4 mm thick, the layer at a depth of 0.02 mm is opposite the layer at a depth of 0.38 mm since both points are 0.02 mm from their respective surfaces.

In one embodiment, the ion-exchange membrane includes one non-woven layer between two reinforcing layers. The two reinforcing layers may be made of different materials, so long as they provide sufficiently identical physical properties to substantially avoid irregular expansion when in a salt solution.

In another embodiment, the ion-exchange membrane includes one reinforcing layer between two non-woven layers. The two non-woven layers may be made of different materials, so long as they provide sufficiently identical physical properties to substantially avoid irregular expansion when in a salt solution.

One example of a physical property of a layer that may affect the expansion is the expansion or contraction tendency of the layer. An ion-exchange membrane that includes reinforcing layers with expansion tendencies that are substantially identical will exhibit reduced irregular expansion when compared to an ion-exchange membrane that includes reinforcing layers with expansion tendencies that are substantially different.

One physical property that may affect the expansion or contraction tendency of a layer is the tensile strength of the layer. Layers of similar tensile strength will resist expansion or contraction to similar degrees. An ion-exchange membrane with a supporting substrate that has layers in such an order that the tensile strength of the layers is symmetrical from one face of the membrane to the other face of the membrane will exhibit less irregular expansion than an ion-exchange membrane having layers of non-symmetrical tensile strength.

The tensile strength of a layer may be different in the machine direction (MD) than in the cross-machine direction (CD). In particular embodiments, it is desirable for the supporting substrate to have layers in such an order that the tensile strengths of the layers in the machine direction is symmetrical from one face of the membrane to the other face of the membrane layers, and the tensile strengths of the layers in the cross-machine direction is symmetrical from one face of the membrane to the other face of the membrane layers.

The tensile strengths may range from 0.2 MPa to 40 N/cm. Exemplary layers include: (A) a polyester meltblown layer that has a MD tensile strength of 0.24 N/cm and a CD tensile strength of 1.04 N/cm; (B) a polypropylene meltblown layer that has a MD tensile strength of 1.8 N/cm and a CD tensile strength of 0.92 N/cm; (C) a polyester spunbond layer that has a MD tensile strength of 11.8 N/cm and a CD tensile strength of 12.2 N/cm; (D) a polypropylene spunbond layer that has a MD tensile strength of 12.2 N/cm and a CD tensile strength of 11.4 N/cm; and (E) a polypropylene spunbond layer that has a MD tensile strength of 30.4 N/cm and a CD tensile strength of 10.5 N/cm. So long as the tensile strengths in the MD and CD directions are each symmetrical from one face of the membrane to the other face of the membrane layers, the layers may include any combination of the above exemplary layers.

For example, an ion-exchange membrane may have a supporting substrate that has the above layers (A) and (D) in the same thickness and in the order (D)-(A)-(D). In this example, the tensile strengths of the first and third layers in the machine direction are identical to each other. In another example, an ion-exchange membrane may have a supporting substrate that has the above layers (B), (C) and (D) in the same thickness and in the order (C)-(B)-(D). In this second example, the tensile strengths of the first and third layers in the machine direction are 3.7% different, and in the cross-machine direction are 6.7% different. In both exemplary membranes, the MD and CD tensile strengths of the layers are symmetrical from one face of the membrane to the other face of the membrane layers.

In an embodiment, the tensile strength of a layer in the MD direction is substantially identical to the tensile strength of the layer in the CD direction. For example: the layer (D) has a tensile strength in the MD direction that is 6.9% different from the tensile strength in the CD direction; and the layer (C) has a tensile strength in the MD direction that is 3.3% different from the tensile strength in the CD direction.

Another physical property that may affect the expansion or contraction tendency of a layer is the density of the layer. Without wishing to be bound by theory, the authors of the present disclosure believe that the density of the layer affects the amounts of ion-exchange material that is absorbed by the layer during manufacture of the ion-exchange membrane. Layers with different amounts of ion-exchange material absorbed therein will expand or contract differently since they will absorb different amounts of salt and water when exposed to a salt solution. An ion-exchange membrane that includes layers with different densities will exhibit more irregular expansion than an ion-exchange membrane having reinforcing layers with substantially identical densities.

In the context of the present disclosure, densities or tensile strengths that are substantially the same would be understood to refer that the values for the densities or tensile strengths are at least within 10% of each other. In particular examples, values that are substantially the same are within 5% of each other. In particular examples, values that are substantially the same are within 2% of each other. The percent difference between two values may be calculated by dividing the difference of the two values by the average of the two values. For example, the difference between 9.5 g/cm$^3$ and 10.5 g/cm$^3$ is 10%.

In one example of an ion-exchange membrane according to the present disclosure, the density of the supporting substrate at a given point in the cross-section of the supporting substrate is substantially the same as the density of the supporting substrate at an opposite point in the cross-section of the supporting substrate. For example, in a supporting substrate that is 0.4 mm thick, the density of the supporting substrate at a depth of 0.02 mm is substantially the same as the density of the supporting substrate at a depth of 0.38 mm since both points are 0.02 mm from their respective surfaces.

The plurality of ion-permeable layers may be formed from a plurality of distinct layers that are bonded together. The supporting substrate may include a first ion-permeable layer having a first density bonded on one side to a second ion-permeable layer having a second density and bonded on the opposite side to a third ion-permeable layer having a third density. The second and third densities are substantially the same. The first density may be from about 0.04 g/cm$^3$ to about 0.6 g/cm$^3$, and the second and third densities may be from about 0.2 g/cm$^3$ to about 0.6 g/cm$^3$. Alternatively, the first density may be from about 0.2 g/cm$^3$ to about 0.6 g/cm$^3$ and the second and third densities may be from about 0.04 g/cm$^3$ to about 0.6 g/cm$^3$.

The first ion-permeable layer may be a melt-blown layer, and the second and third ion-permeable layers may be spunbond layers. Alternatively, the first ion-permeable layer may be a spunbond layer, and the second and third ion-permeable layers may be melt-blown layers.

In one exemplary ion-exchange membrane according to the present disclosure, the ion-exchange membrane includes, as a supporting substrate, at least one non-woven fabric layer and at least one reinforcing layer. The layers are arranged in a symmetrical order of layers, from one face of the membrane to the other face of the membrane.

In particular examples, the ion-exchange membrane includes a three-layered structure having one non-woven layer sandwiched between two reinforcing layers. In other particular examples, the ion-exchange membrane includes a three-layered structure having one reinforcing layer sandwiched between two non-woven layers.

When ion-exchange membranes according to the present disclosure include a plurality of non-woven layers, the non-woven layers are, in an embodiment, identical. When ion-exchange membranes according to the present disclosure include a plurality of reinforcing layers, the reinforcing layers are, in an embodiment, identical. In an embodiment, when ion-exchange membranes according to the present disclosure include a plurality of non-woven layers and a plurality of reinforcing layers, the non-woven layers are identical to each other and the reinforcing layers are identical to each other.

In particular examples, all of the layers in the supporting substrate are made of the same chemical material, though, for example, the non-woven layer or layers may have different diameter fibers, different densities, and/or different tensile strengths than the reinforcing layer or layers. The layers of the supporting substrate may be made of, for example: polypropylene, polyester, or polyacrylonitrile.

BRIEF DESCRIPTION OF THE DRAWINGS

Embodiments of the present disclosure will now be described, by way of example only, with reference to the attached Figures.

DETAILED DESCRIPTION

Figure 1:
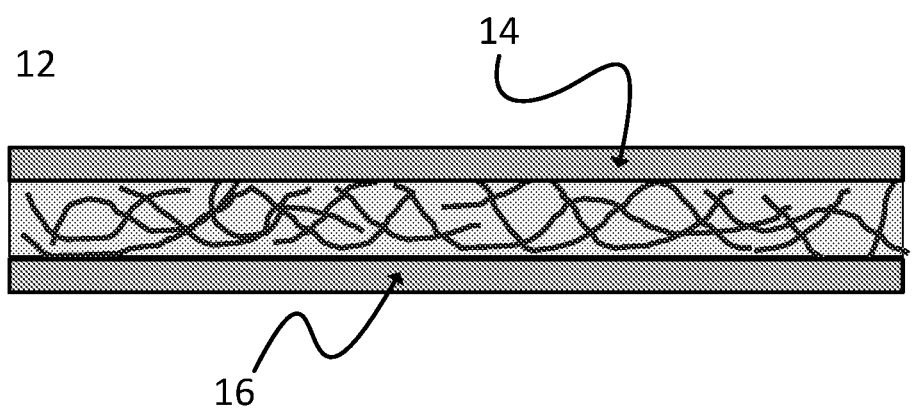
FIG. 1 is an illustration of an embodiment of an ion-exchange membrane according to the present disclosure.

Generally, the present disclosure provides an ion-exchange membrane having a supporting membrane substrate that includes ion-permeable layers in an order such that opposing layers in the supporting substrate provide sufficiently identical physical properties to substantially avoid irregular expansion when in a salt solution.

In one aspect, the present disclosure provides an ion-exchange membrane having at least one non-woven layer, and at least one reinforcing layer, where the order of layers is symmetrical from one face of the membrane to the other face of the membrane.

In another aspect, the ion-permeable layers are in an order such that the density of the supporting substrate at a given point in the cross-section of the supporting substrate is substantially the same as the density of the supporting substrate at an opposite point in the cross-section of the supporting substrate.

In yet another aspect, the ion-permeable layers are in an order such that the tensile strength of the supporting substrate at a given point in the cross-section of the supporting substrate is substantially the same as the tensile strength of the supporting substrate at an opposite point in the cross-section of the supporting substrate.

The layers of the ion-exchange membrane are, in an embodiment, loaded with ion-exchange material. The ionic functional groups in the ion-exchange material may be a sulfonic acid group, carboxylic acid group, phosphoric acid group, quaternary ammonium group, imidazolium group, pyridinium group, or salt thereof.

The ion-exchange material may be, for example, ion-exchange resin that has been formed through the polymerization of an ionic monomer and a crosslinker. The ionic monomer and crosslinker may be dissolved in a solvent saturating the support substrate.

In some examples, the ion-exchange material may be a cation-exchange polymer formed from the polymerization with 2-acrylamido-2-methylpropane sulfonic acid, sodium 2-acrylamido-2-methylpropane sulfonate, potassium 3-sulfopropyl acrylate, sodium methallyl sulfonate, sodium vinyl sulfonate, sodium 4-vinylbenzenesulfonate, lithium 4-vinylbenzenesulfonate, acrylic acid, 2-ethylacrylic acid, methacrylic acid, 2-propylacrylic acid, sodium acrylate, sodium methacrylate, ethylene glycol methacrylate phosphate, vinylphosphonic acid, or bis[2-(methacryloyloxy)ethyl] phosphate. In some examples, the ion-exchange material may be an anion-exchange polymer formed from the polymerization with N-trimethylaminoethylmethacrylate chloride (TMAEMC), [2-(acryloyloxy)ethyl] trimethylammonium chloride, [2-(methacryloyloxy)ethyl] trimethylammonium chloride, (3-acrylamidopropyl) trimethylammonium chloride, [3-(methacryloylamino)propyl] trimethylammonium chloride, diallyldimethylammonium chloride, or (vinylbenzyl)trimethylammonium chloride, 1-vinyl-3-ethylimidazolium bromide, or 4-vinylpyridinium tribromide.

Alternatively, the layers of the ion-exchange membrane may be formed through polymerization with a non-ionic monomer and crosslinker, and subsequently treated to introduce an anionic or cationic group. For example, the support substrate may be first saturated with a chemical mixture which contains at least one monomer, at least one crosslinker, and an initiator. The saturated support substrate may be cured at an elevated temperature to polymerize the monomer and crosslinker. The resulting material may then treated to introduce, for example, a sulfonic acid group or a quaternary ammonium group. One example of such a preparation is the polymerization of styrene with divinylbenzene, followed by sulfonation. Another example of such a preparation is the polymerization of styrene with divinylbenzene, followed by chloromethylation and amination with triamine.

In another alternative method, the layers of the ion-exchange membrane may be formed through casting a dissolved polymer into the layers of the support substrate. For example, a polymer with positive or negative charges may be dissolved in an organic solvent to form a homogeneous solution. The resulting solution may then be cast into the support substrate with a knife. The organic solvent in the saturated substrate may then be removed, in an embodiment, under vacuum at an elevated temperature, to provide the ion-exchange membrane. The negatively charged polymers may be, for example: sulfonated polysulfone, sulfonated polyethersulfone, or sulfonated polyvinylidene floride. The positively charged polymers may be, for example: quaternized poly(vinyl benzyl chloride), or quaternized poly(phenylene oxide). The organic solvent may include, for example: 1-Methyl-2-pyrrolidinone, N,N-Dimethylformamide, or N,N-Dimethylacetamide.

In one embodiment, illustrated in FIG. 1, the ion-exchange membrane (10) includes a non-woven layer (12) sandwiched between two reinforcing layers (14, 16). The non-woven layer (12) and reinforcing layers (14, 16) are impregnated with an ion-exchange material.

Figure 2:
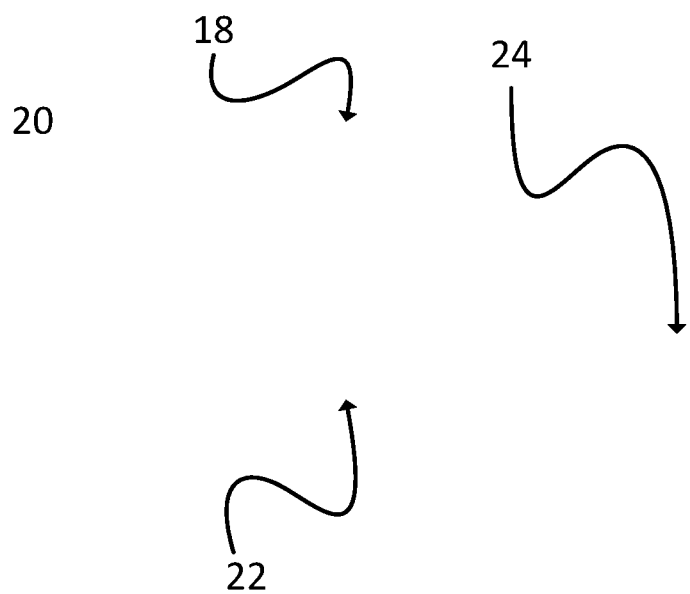
FIG. 2 is an illustration of an embodiment of an ion-exchange membrane according to the present disclosure.

In another embodiment, illustrated in FIG. 2, the ion-exchange membrane (18) includes two non-woven layers (20, 22) sandwiching one reinforcing layer (24). The non-woven layers (20, 22) and reinforcing layer (24) are impregnated by ion-exchange material.

In one example of an ion-exchange membrane according to the present disclosure, the supporting substrate is composed of a non-woven layer (12) and two reinforcing layers (14, 16). The supporting substrate is saturated with an anion-exchange material. The anion-exchange material is formed from the polymerization of N-trimethylaminoethylmethacrylate chloride (TMAEMC) and ethylene glycol dimethacrylate (EDGM) in the presence of a radical initiator, such as dimethyl 2,2'-azobis(2-methylpropionate) (V-601). The monomers and initiator are dissolved in dipropylene glycol (DPG), and the supporting substrate is saturated with the resulting solution. The saturated supporting substrate is cured at an elevated temperature to polymerize the monomer and crosslinker. When 17.6 grams of TMAEMC, 10.9 g of EDGM and 0.2 g of V-601 are dissolved in 15.2 g of DPG and subsequently polymerized on a Tapyrus non-woven polyester support substrate, the resulting anion-exchange membrane has an ion exchange capacity (IEC) of 2.71 meq/g and a water content of 42.8%.

In another example, the supporting substrate is composed of a non-woven layer (12) and two reinforcing layers (14, 16) and the supporting substrate is saturated with a cation-exchange material. The cation-exchange material is formed from the polymerization of 2-acrylamido-2-methylpropane sulfonic acid (AMPS) and EGDM in the presence of a radical initiator, such as tert-butylperoxy 2-ethylhexyl carbonate (TPO). The monomers and initiator are dissolved in a solution of water and 1-methyl-2-pyrollidinone (NMP), and the supporting substrate is saturated with the resulting solution. The saturated supporting substrate is cured at an elevated temperature to polymerize the monomer and crosslinker. When 34.2 grams of AMPS, 33.06 g of EGDM and 1.05 mL of TPO are dissolved in a solution of 3.6 g water, and 38.9 g of NMP, and subsequently polymerized on a Tapyrus non-woven polyester support substrate, the resulting cation-exchange membrane has an ion exchange capacity (IEC) of 2.5 meq/g and a water content of 40%.

In the examples discussed above, the Tapyrus non-woven polyester support substrate is a three-layered substrate having two reinforcing layers sandwiching one non-woven layer. All three layers are made of polyester. The reinforcing layers are spunbond and the non-woven layer is melt-blown. The non-woven layer is a non-woven fabric sheet. The three layers are bonded to each other, for example by calendering them through a heated nip roller. The heated nip roller may be heated to over 100° C. Spunbond layers have larger diameter fibers than melt-blown layers. Spunbond fibers, in an embodiment, have a diameter of 15 to 35 µm. Melt blown fibers, in an embodiment, have a diameter in the range of 2 to 4 µm, although they may be as small as 0.1 µm and as large as 10 µm. The smaller diameter fibers in the melt-blow layers provide a greater porosity to the non-woven substrate layer, in comparison to the spunbond reinforcing layers. The porosity of the non-woven substrate layer may be more than 70%.

In the exemplary ion-exchange membranes discussed above, the ion-exchange materials were tested with three different non-woven polyester support substrates having the following specifications:

TABLE 1

| Support Substrate | Basis weight | Thickness | Density | Air Permeability | Maximum Pore Size |
|---|---|---|---|---|---|
| A | 80 g/m$^2$ | 0.28 mm | 0.000286 g/mm$^3$ | 56 cc/cm$^2$/s | 60 µm |
| B | 80 g/m$^2$ | 0.23 mm | 0.000348 g/mm$^3$ | 37 cc/cm$^2$/s | 45 µm |
| C | 80 g/m$^2$ | 0.30 mm | 0.000267 g/mm$^3$ | 18 cc/cm$^2$/s | 20 µm |

The polyester support substrates are stable to acidic conditions found in electrodialysis (ED), bipolar ED, reversed electrodialysis (RED), electrodeionization (EDI), and electrodialysis reversal (EDR).

The ion-exchange polymers used in the two exemplary membranes discussed above are only two examples of resins that may be impregnated into the supporting substrate. Other cationic or anionic polymers known in the art may be used. For example, polymers may be used that include: sulfonic acid groups, for example sodium polystyrene sulfonate; carboxylic acid groups; or quaternary amino groups, for example poly (acrylamido-N-propyltrimethylammonium chloride). Specific examples of polymers that may be used include polymers formed using (vinylbenzyl)trimethylammonium chloride, and lithium styrene sulfonate.

In another example of an ion-exchange membrane according to the present disclosure, the supporting substrate is composed of a non-woven layer (12) and two reinforcing layers (14, 16). The supporting substrate is saturated with an anion-exchange material formed from the polymerization of (vinylbenzyl)trimethylammonium chloride (VBTAC) and divinyl benzene (DVB) in the presence of a radical initiator, such as tert-butylperoxy 2-ethylhexyl carbonate (TPO). The monomers and initiator are dissolved in DPG, and the supporting substrate is saturated with the resulting solution. The saturated substrate is cured at an elevated temperature to polymerize the monomer and crosslinker. When 28.9 grams of VBTAC, 29.7 g of DVB and 0.9 ml of TPO are dissolved in 38.5 g of DPG and subsequently polymerized on a Tapyrus non-woven polypropylene support substrate, the resulting anion-exchange membrane has an ion exchange capacity (IEC) of 2.5 meq/g and a water content of 35%.

In another example of an ion-exchange membrane according to the present disclosure, the supporting substrate is composed of a non-woven layer (12) and two reinforcing layers (14, 16). The supporting substrate is saturated with a cation-exchange material. The cation-exchange material is formed from the polymerization of lithium styrene sulfonate (LiSS) and DVB in the presence of a radical initiator, such as V-601. The monomers and initiator are dissolved in NMP, and all the three layers are saturated with the resulting solution. The saturated substrate is cured at an elevated temperature to polymerize the monomer and crosslinker. When 17.6 g of LiSS, 15.2 g of DVB and 0.2 g of V-601 are dissolved in 24.0 g of NMP and subsequently polymerized on the Tapyrus non-woven polypropylene support substrate, the resulting cation-exchange membrane has an ion exchange capacity (IEC) of 2.5 meq/g and a water content of 45%.

The ion-exchange materials discussed above were tested with three different non-woven polypropylene support substrates having the following specifications:

TABLE 2

| Support Substrate | Basis weight | Thickness | Density | Air Permeability | Maximum Pore Size |
|---|---|---|---|---|---|
| D | 83 g/m$^2$ | 0.30 mm | 0.000277 g/mm$^3$ | 28 cc/cm$^2$/s | 55 µm |
| E | 109 g/m$^2$ | 0.32 mm | 0.000341 g/mm$^3$ | 6.9 cc/cm$^2$/s | 30 µm |
| F | 125 g/m$^2$ | 0.31 mm | 0.000403 g/mm$^3$ | 1.2 cc/cm$^2$/s | 13 µm |

The polypropylene support substrates are hydrophobic, and substrates E and F were treated with a surfactant prior to being saturated with the solution containing the monomer and crosslinker. The polypropylene support substrate are stable to caustic conditions found in electrodialysis (ED), bipolar ED, reversed electrodialysis (RED), electrodeionization (EDI), and electrodialysis reversal (EDR).

Although the exemplary ion-exchange membranes were made using non-woven polypropylene or polyester layer, other non-woven layers may be used. For example, a non-woven polyethylene layer, a non-woven polyvinyl chloride layer, a non-woven polyacrylonitrile layer, or a non-woven polyamide layer may be used.

Ion-exchange membranes made with the Tapyrus three-layered polyester support substrates A-C using either the anion-exchange material (Samples 1-3), or the cation-exchange material (Samples 4-6) had the following properties:

TABLE 3

| Sample | Support Substrate | ion-exchange material | IEC (meq/g) | WC (%) |
|---|---|---|---|---|
| 1 | A | quaternary ammonium (anion exchange) | 2.35 | 48.2 |
| 2 | B | quaternary ammonium (anion exchange) | 2.39 | 47.6 |
| 3 | C | quaternary ammonium (anion exchange) | 2.37 | 48.8 |
| 4 | A | sulfonate (cation exchange) | 2.16 | 47.5 |
| 5 | B | sulfonate (cation exchange) | 2.15 | 46.7 |
| 6 | C | sulfonate (cation exchange) | 2.24 | 47.8 |

Ion-exchange membranes made with the Tapyrus three-layered polypropylene support substrates D-F using either the anion-exchange material (Samples 7-9), or the cation-exchange material (Samples 10-12) had the following properties:

TABLE 4

| Sample | Support Substrate | ion-exchange material | IEC (meq/g) | WC (%) |
|---|---|---|---|---|
| 7 | D | quaternary ammonium (anion exchange) | 2.22 | 39.8 |
| 8 | E | quaternary ammonium (anion exchange) | 2.26 | 41.3 |
| 9 | F | quaternary ammonium (anion exchange) | 2.25 | 41.8 |
| 10 | D | sulfonate (cation exchange) | 2 16 | 44 7 |
| 11 | E | sulfonate (cation exchange) | 2.15 | 45.6 |
| 12 | F | sulfonate (cation exchange) | 2.24 | 46.3 |

Figure 3:
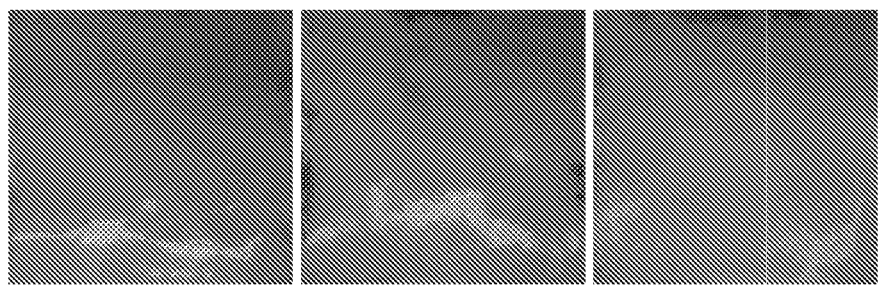
FIG. 3 is a set of photographs showing the results of leak tests performed on exemplary membranes according to the present disclosure.
Figure 3:
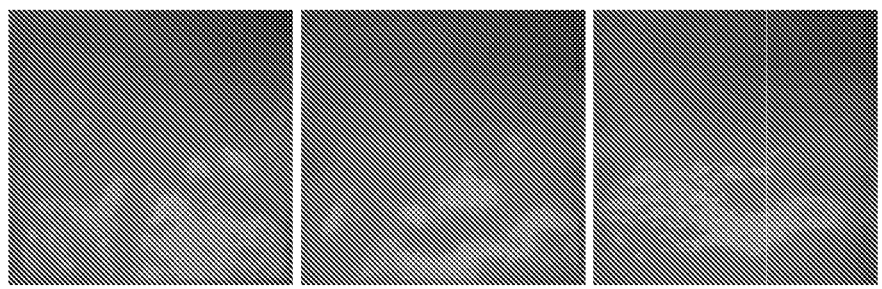

The resulting membranes were tested in a leak test using a dye to identify leaks in the membrane. The leak test for the anion-exchange membranes used an aqueous solution of 5% methylene blue, and the leak test for the cation-exchange membranes used an aqueous solution of 5% of Erythrosin B. Photos of anion-exchange membranes and cation-exchange membranes made using the Tapyrus three-layered polyester substrate are shown in FIG. 3. The anion-exchange membranes exhibited: one leak and a smooth surface (Sample 1); no leaks and one small rough area (Sample 2); and no leaks and a smooth surface (Sample 3). The cation-exchange membranes with the Tapyrus three-layered polyester substrate exhibited: no leaks but the dye permeated through the membrane (Sample 4); no leaks (Sample 5); and no leaks (Sample 6). Ion-exchange membranes useful for electrodialysis (ED), bipolar ED, reversed electrodialysis (RED), electrodeionization (EDI), or electrodialysis reversal (EDR) should, in an embodiment, be leak free.

The membranes were tested in a Mullen burst machine, which measures the pressure required to puncture the membrane and is an indicator of the load carrying capacity. Sample 1 burst at 98 psi, Sample 2 burst at 115 psi, Sample 3 burst at 92 psi, Sample 4 burst at 105 psi, Sample 5 burst at 113 psi, and Sample 6 burst at 96 psi.

The resistances of the membranes in a 0.01 N NaCl solution were also measured using a non-contact resistance measurement device, and the thicknesses of the membranes were determined using a spiral micrometer. The membranes had the following properties:

TABLE 5

| Sample | resistance (ohm-cm$^2$) | thickness (mm) |
|---|---|---|
| 1 | 3.96 ± 0.80 | 0.30 ± 0.07 |
| 2 | 3.48 ± 0.36 | 0.27 ± 0.01 |
| 3 | 3.56 ± 0.45 | 0.31 ± 0.06 |
| 4 | 5.40 ± 0.60 | 0.31 ± 0.07 |
| 5 | 5.33 ± 0.55 | 0.28 ± 0.02 |
| 6 | 5.48 ± 0.36 | 0.33 ± 0.09 |
| 7 | 8.45 ± 0.56 | 0.31 ± 0.08 |
| 8 | 7.30 ± 0.33 | 0.32 ± 0.03 |
| 9 | 9.67 ± 0.28 | 0.31 ± 0.07 |
| 10 | 6.48 ± 0.67 | 0.30 ± 0.06 |
| 11 | 6.19 ± 0.38 | 0.33 ± 0.02 |
| 12 | 6.77 ± 0.53 | 0.32 ± 0.09 |

The resistances of the ion-exchange membranes are expected to be substantially identical to the resistances of corresponding two-layer ion-exchange membranes so long as the thickness of the membranes are the same.

Various physical properties of exemplary ion-exchange membranes were compared to ion-exchange membranes made with (a) a 0.15 mm-thick woven polypropylene support substrate from Tri-Ocean, or (b) a 0.45 mm-thick acrylic support substrate. The three exemplary ion-exchange membranes (Samples 13-15) used the Tapyrus support substrate A-C, respectively, which are discussed above. The air permeabilities of the Tri-Ocean support substrate and the acrylic support substrate are about ten times greater than the air permeability of the Tapyrus support substrate.

An anion-exchange material was polymerized on the support substrates by dissolving 58.0 g of TMAEMC, 24.6 g of EDGM and 0.4 g of VA-601 in 13.03 g of DPG and 10.5 g n-propanol, saturating the support substrate with the resulting solution, and polymerizing the monomer and cross-linker. The target ion exchange capacity (IEC) was 3.14 meq/g, and the target water content was 33.1%.

Figure 4:
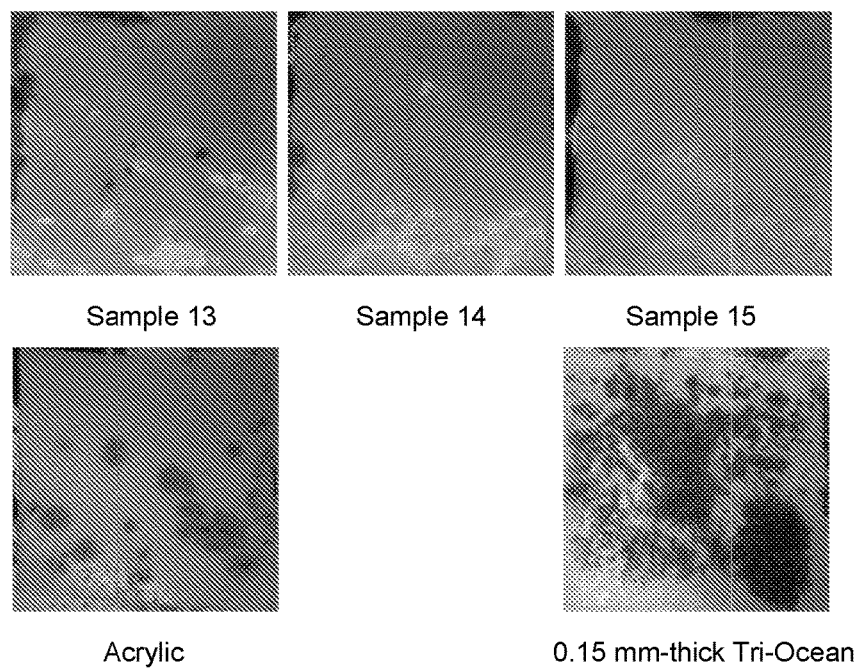
FIG. 4 is a set of photographs showing the results of leak tests performed on exemplary membranes according to the present disclosure, and on comparison membranes.

The membrane with the acrylic support substrate had a rough surface, an IEC of 2.84 meq/g, and a WC of 39.8%. Leak testing, as described above, showed leaking through the membrane with the acrylic support substrate. The membrane with the 0.15 mm thick Tri-Ocean woven support substrate showed serious leaking. Samples 13 and 14 showed rough surfaces and some leaks. Sample 15 showed a rough surface but no leaks. Photographic results of the leak tests are shown in FIG. 4.

Mullen burst tests showed that the ion-exchange membrane with the acrylic support substrate burst at 195 psi; the ion-exchange membrane with the Tri-Ocean 0.15 mm-thick support substrate burst at 210 psi; and ion-exchange membrane samples 13-15 burst at 170 psi, 120 psi, and 120 psi, respectively.

The thicknesses of the membranes were measured. Resistances were measured at 0.01 N NaCl and 0.5 N NaCl.

TABLE 6

| Sample | resistance (ohm-cm$^2$) at 0.01N NaCl | resistance (ohm-cm$^2$) at 0.5N NaCl | thickness (mm) |
|---|---|---|---|
| Acrylic | 8.84 | 3.55 | 0.68 |
| 13 | 3.42 | 2.03 | 0.30 |
| 14 | 3.13 | 1.98 | 0.27 |
| 15 | 3.56 | 2.23 | 0.33 |

An additional exemplary anion-exchange membrane was made and its physical properties were compared to ion-exchange membranes made with (a) a 0.15 mm-thick woven support substrate from Tri-Ocean, (b) a 0.24 mm-thick woven support substrate from Tri-Ocean, or (c) a 0.45 mm-thick acrylic support substrate. These support substrates are woven from multifiber filaments, and are very structured and symmetrical. The exemplary ion-exchange membrane (Sample 16) used the Tapyrus support substrate A, which is discussed above.

An anion-exchange material was polymerized on the support substrates by dissolving 17.6 g of TMAEMC, 10.9 g of EDGM and 0.2 g of VA-601 in 15.2 g of DPG, saturating the support substrate with the resulting solution, and polymerizing the monomer and cross-linker. The target ion exchange capacity (IEC) was 2.71 meq/g, and the target water content was 42.6%.

Figure 5:
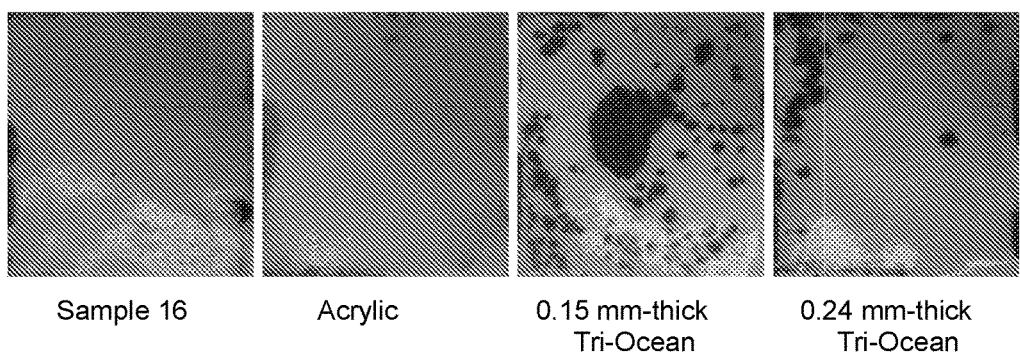
FIG. 5 is a set of photographs showing the results of leak tests performed on an exemplary membrane according to the present disclosure, and on comparison membranes.

The ion-exchange membrane with the acrylic support substrate had a smooth surface, an IEC of 2.42 meq/g, and a WC of 42.6%. Leak testing, as described above, showed one leak. The ion-exchange membrane with the 0.15 mm thick Tri-Ocean woven support substrate showed serious leaking. The ion-exchange membrane with the 0.24 mm thick Tri-Ocean woven support substrate showed serious leaking, but less leaking than in the ion-exchange membrane with the 0.15 mm thick Tri-Ocean woven support substrate. Sample 16 showed a smooth surface and one leak. Without wishing to be bound by theory, the authors of the present disclosure believe that the highly interlaced structure of the non-woven material reduces the chance of a membrane leaking, when compared to supporting substrates made using woven materials. Photographic results of the leak tests are shown in FIG. 5. The exemplary membranes made with non-woven layers exhibit less leaking than membranes made with woven layers. This may be due to the increased amount of interlacing fibers in the non-woven layers.

Mullen burst tests showed that the membrane with the acrylic support substrate burst at 200 psi; the membrane with the Tri-Ocean 0.15 mm-thick support substrate burst at 210 psi; the membrane with the Tri-Ocean 0.24 mm-thick support substrate burst at 240 psi; and membrane sample 16 burst at 118 psi.

The thicknesses of the membranes were measured. Resistances were measured at 0.01 N NaCl and 0.5 N NaCl.

TABLE 7

| Sample | resistance (ohm-cm$^2$) at 0.01N NaCl | resistance (ohm-cm$^2$) at 0.5N NaCl | thickness (mm) |
| --- | --- | --- | --- |
| 16 | 4.23 | 2.77 | 0.30 |
| Acrylic | 8.97 | 4.58 | 0.65 |
| Tri-Ocean 0.24 mm | 5.53 | 2.45 | 0.32 |

Figure 6:
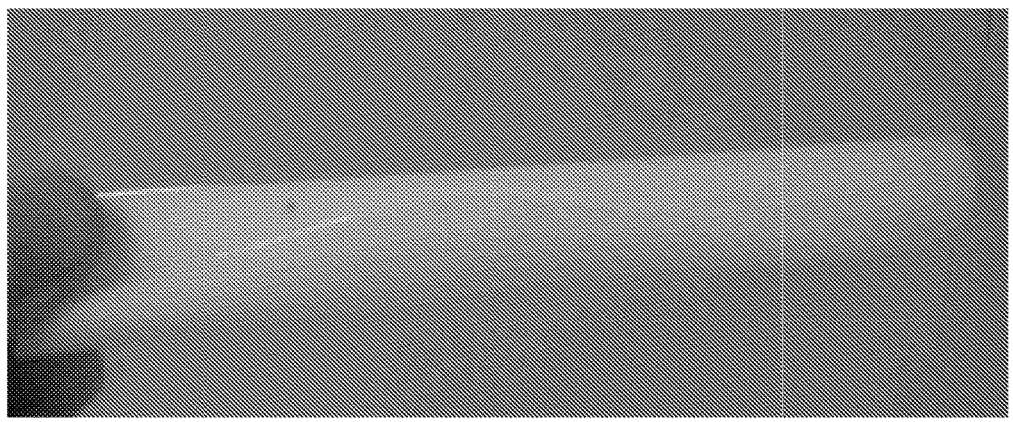
FIG. 6 is a photograph of an ion-exchange membrane made from a two-layer substrate.
Figure 7:
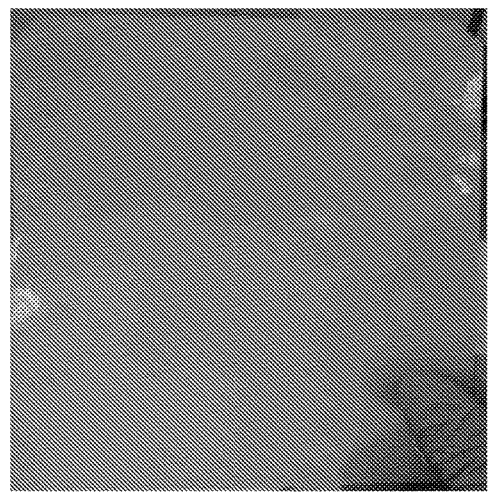
FIG. 7 is a photograph of an ion-exchange membrane made from an exemplary three-layer substrate according to the present disclosure.

The effect of exposure to a salt solution on an exemplary ion-exchange membrane according to the present disclosure to a salt solution was compared to the effect on an ion-exchange membrane made with a two-layer support substrate. The ion-exchange membrane with a two-layer support structure was generated by bonding a non-woven layer to a reinforcing layer by calendaring the two layers through a heated nip roller. As shown in FIG. 6, the ion-exchange membrane made with the two-layer substrate exhibits significant curling, indicating that the two layers expand differently on exposure to the salt solution. In contrast, as shown in the photographs of samples 1-6 and 13-16 in FIGS. 3-5 and in the photograph of the sample shown in FIG. 7, the ion-exchange membrane made with the three-layer substrate according to the present disclosure exhibits reduced curling.

In the preceding description, for purposes of explanation, numerous details are set forth in order to provide a thorough understanding of the embodiments. However, it will be apparent to one skilled in the art that these specific details are not required. Accordingly, what has been described is merely illustrative of the application of the described embodiments and numerous modifications and variations are possible in light of the above teachings.

Since the above description provides example embodiments, it will be appreciated that modifications and variations can be effected to the particular embodiments by those of skill in the art. Accordingly, the scope of the claims should not be limited by the particular embodiments set forth herein, but should be construed in a manner consistent with the specification as a whole.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An ion-exchange membrane comprising:
   a supporting substrate comprising at least three ion-permeable layers disposed in a symmetrical order from one face of the membrane to the opposite face of the membrane; and
   an ion-exchange material;
   wherein the ion-permeable layers are impregnated with the ion-exchange material and comprise:
      at least one non-woven fabric layer; and at least one non-woven reinforcing layer,
      wherein the at least one non-woven fabric layer is different from the at least one non-woven reinforcing layer.

2. The ion-exchange membrane according to claim 1, wherein the supporting substrate comprises a plurality of non-woven layers and the plurality of non-woven layers all have substantially the same density or substantially the same tensile strength.

3. The ion-exchange membrane according to claim 1, wherein the ion-exchange membrane comprises one non-woven reinforcing layer sandwiched between two non-woven fabric layers.

4. The ion-exchange membrane according to claim 1, wherein the supporting substrate comprises a plurality of non-woven reinforcing layers and the plurality of non-woven reinforcing layers all have substantially the same density or substantially the same tensile strength.

5. The ion-exchange membrane according to claim 1, wherein the ion-exchange membrane comprises one non-woven fabric layer sandwiched between two non-woven reinforcing layers.

6. The ion-exchange membrane according to claim 1, wherein the ion-exchange material is a cation-exchange polymer comprising sulfonic acid groups, carboxylic acid groups, phosphoric acid groups, or salts thereof.

7. The ion-exchange membrane according to claim 6, wherein the cation-exchange polymer is a polymer formed from the polymerization with 2-acrylamido-2-methylpropane sulfonic acid, sodium 2-acrylamido-2-methylpropane sulfonate, potassium 3-sulfopropyl acrylate, sodium methallyl sulfonate, sodium vinyl sulfonate, sodium 4-vinylbenzenesulfonate, lithium 4-vinylbenzenesulfonate, acrylic acid, 2-ethylacrylic acid, methacrylic acid, 2-propylacrylic acid, sodium acrylate, sodium methacrylate, ethylene glycol methacrylate phosphate, vinylphosphonic acid, or bis[2-(methacryloyloxy)ethyl] phosphate.

8. The ion-exchange membrane according to claim 1, wherein the ion-exchange material is an anion-exchange polymer comprising quaternary ammonium groups, imidazolium groups, or pyridinium groups.

9. The ion-exchange membrane according to claim 8, wherein the anion-exchange polymer is a polymer formed from the polymerization with N-trimethylaminoethylmethacrylate chloride (TMAEMC), [2-(acryloyloxy)ethyl] trimethylammonium chloride, [2-(methacryloyloxy)ethyl] trimethylammonium chloride, (3-acrylamidopropyl) trimethylammonium chloride, [3-(methacryloylamino)propyl] trimethylammonium chloride, diallyldimethylammonium chloride, (vinylbenzyl)trimethylammonium chloride, 1-vinyl-3-ethylimidazolium bromide, or 4-vinylpyridinium tribromide.

10. The ion-exchange membrane according to claim 1, wherein the at least three ion-permeable layers are all made of the same chemical material.

11. The ion-exchange membrane according to claim 1, wherein the at least one non-woven fabric layer is a non-woven fabric sheet of: polypropylene, polyethylene, polyvinyl chloride, polyester, polyacrylonitrile, or polyamide.

12. The ion-exchange membrane according to claim 1, wherein adjacent ion-permeable layers are bonded together.

13. The ion-exchange membrane according to claim 1, wherein the supporting substrate has a thickness of less than 0.5 mm.

14. The ion-exchange membrane according to claim 1, wherein the supporting substrate has a thickness of about 0.15 mm to about 0.35 mm.

15. The ion-exchange membrane according to claim 1, wherein the supporting substrate has an air permeability of at least 0.5 cc/cm2/s.

16. An electrolytic cell stack comprising a plurality of ion-exchange membranes according to claim 1.

17. The ion-exchange membrane according to claim 1, wherein the at least one non-woven reinforcing layer is a spunbond layer and the at least one non-woven fabric layer is a meltblown layer.

18. An ion-exchange membrane comprising:
an ion-exchange material; and
a supporting membrane substrate impregnated with the ion-exchange material, the supporting substrate comprising non-woven ion-permeable layers that are bonded together in an order such that the density of the supporting substrate at a given point in the cross-section of the supporting substrate is substantially the same as the density of the supporting substrate at an opposite point in the cross-section of the supporting substrate.

19. The ion-exchange membrane according to claim 18, wherein:
the non-woven ion-permeable layers are distinct layers, and the supporting substrate includes a first ion-permeable non-woven layer having a first density bonded on one side to a second ion-permeable non-woven layer having a second density and bonded on the opposite side to a third ion-permeable non-woven layer having a third density that is substantially the same as the second density.

20. The ion-exchange membrane according to claim 18, wherein the non-woven ion-permeable layers comprise at least one spunbond layer and at least one meltblown layer.

21. A method comprising:
saturating or impregnating a supporting membrane substrate comprising at least three ion-permeable layers disposed in a symmetrical order from one face of the membrane to the opposite face of the membrane with a solution comprising an anionic or cationic monomer and a crosslinker; and
polymerizing the monomer and crosslinker;
wherein the ion-permeable layers comprise:
at least one non-woven fabric layer; and
at least one non-woven reinforcing layer,
wherein the at least one non-woven fabric layer is different from the at least one non-woven reinforcing layer.

22. The method according to claim 21, wherein the at least one non-woven reinforcing layer is a spunbond layer and the at least one non-woven fabric layer is a meltblown layer.

23. A method comprising:
saturating or impregnating a supporting membrane substrate comprising at least three non-woven ion-permeable layers that are bonded together with a solution comprising an anionic or cationic monomer and a crosslinker; and
polymerizing the monomer and crosslinker;
wherein the density of the supporting substrate at a given point in the cross-section of the supporting substrate is substantially the same as the density of the supporting substrate at an opposite point in the cross-section of the supporting substrate.

24. The method according to claim 23, wherein the at least three non-woven ion-permeable layers comprise at least one spunbond layer and at least one meltblown layer.

* * * * *